(12) United States Patent
Pruessel et al.

(10) Patent No.: US 9,302,566 B2
(45) Date of Patent: Apr. 5, 2016

(54) METHOD FOR SHORT DROP ADJUSTMENT IN A FRAMELESS GLASS VEHICLE WINDOW SYSTEM

(71) Applicant: Robert Bosch GmbH, Stuttgart (DE)

(72) Inventors: Holger Pruessel, Sinzheim (DE); Scott Averitt, Roseville, MI (US); Kumar Saurabh, Electronic (IN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/381,259

(22) PCT Filed: Feb. 25, 2013

(86) PCT No.: PCT/EP2013/053729
§ 371 (c)(1),
(2) Date: Aug. 27, 2014

(87) PCT Pub. No.: WO2013/127744
PCT Pub. Date: Sep. 6, 2013

(65) Prior Publication Data
US 2015/0101249 A1    Apr. 16, 2015

(30) Foreign Application Priority Data

Feb. 27, 2012 (IN) .............................. 725/CHE/2012

(51) Int. Cl.
*B60J 1/17*    (2006.01)
*E05F 15/71*    (2015.01)
(Continued)

(52) U.S. Cl.
CPC . *B60J 1/17* (2013.01); *E05F 15/60* (2015.01); *E05F 15/695* (2015.01); *E05F 15/71* (2015.01);
(Continued)

(58) Field of Classification Search
CPC ............ B60J 1/17; E05F 15/71; E05F 15/60; E05F 15/695; E05F 15/689; G01B 2210/58; E05Y 2400/342; E05Y 2400/51; E05Y 2201/604; E05Y 2900/508
USPC ......... 49/26–32, 348–352; 318/266, 445, 466
See application file for complete search history.

(56) References Cited

U.S. PATENT DOCUMENTS 2,405,062 A * 7/1946 Sheldon ................... H02G 7/02
137/517
3,141,352 A * 7/1964 Richter ................... B64C 13/30
74/501.5 R (Continued)

FOREIGN PATENT DOCUMENTS

DE       19632910      10/1997
DE       102007031409   1/2009
WO       2011023955    3/2011

OTHER PUBLICATIONS

International Search Report for Application No. PCT/EP2013/053729 dated May 28, 2013 (3 pages).

*Primary Examiner* — Katherine Mitchell
*Assistant Examiner* — Justin Rephann
(74) *Attorney, Agent, or Firm* — Michael Best & Friedrich LLP

(57) ABSTRACT

A method for controlling movement of a window glass (12) in a vehicle using an electric motor (26) associated with a drive mechanism (1,2,3,4) through a cable (50), said method comprising the steps: determining an actual position (X2) of the window glass (12) based on the movement of the motor (26), determining a cable stiffness (S2), determining a position lag (400) of the window glass (12) based on the determined actual position (X2) of the window glass (12), a predetermined position (Z2) of the window glass (12) and the cable stiffness (S2); and continuously correcting the position of the window glass (12) based on the determined position lag (400).

6 Claims, 4 Drawing Sheets

(51) Int. Cl.
  *E05F 15/695* (2015.01)
  *E05F 15/60* (2015.01)
  *E05F 11/48* (2006.01)
  *E05F 15/689* (2015.01)

(52) U.S. Cl.
  CPC ............ *E05F 11/488* (2013.01); *E05F 15/689* (2015.01); *E05Y 2201/604* (2013.01); *E05Y 2400/322* (2013.01); *E05Y 2400/342* (2013.01); *E05Y 2400/358* (2013.01); *E05Y 2400/51* (2013.01); *E05Y 2900/508* (2013.01); *E05Y 2900/55* (2013.01); *G01B 2210/58* (2013.01)

(56) References Cited

U.S. PATENT DOCUMENTS

| | | | | |
|---|---|---|---|---|
| 5,248,897 A * | 9/1993 | Lee | ........................ | B60J 7/0573 180/281 |
| 5,316,365 A * | 5/1994 | Kuhlman | ................... | B60J 5/06 296/155 |
| 5,323,570 A * | 6/1994 | Kuhlman | .............. | E05F 15/646 49/138 |
| 6,364,397 B1 * | 4/2002 | Bordeaux | ................. | B60J 1/08 296/146.2 |
| 6,748,308 B2 * | 6/2004 | Losey | .................... | B60J 7/0573 236/49.3 |
| 6,867,562 B2 * | 3/2005 | Weiner | .................. | E05F 17/004 318/264 |
| 7,121,044 B2 * | 10/2006 | Santaolalla Gil | ..... | E05F 11/486 49/352 |
| 7,362,068 B2 * | 4/2008 | Yamamoto | ........... | H02H 7/0851 318/266 |
| 7,424,353 B2 * | 9/2008 | Engelhardt | ......... | B60R 21/0134 180/271 |
| 7,861,460 B1 * | 1/2011 | Costello | .................. | E05F 15/72 180/281 |
| 8,291,645 B2 * | 10/2012 | Hohn | .................... | B60J 7/0573 49/348 |
| 2001/0030520 A1 * | 10/2001 | Losey | ..................... | G01M 3/12 318/445 |
| 2002/0005701 A1 * | 1/2002 | Bonduel | ................ | E05F 15/695 318/445 |
| 2002/0152013 A1 * | 10/2002 | Knab | ................... | G05B 19/4061 701/49 |
| 2004/0095084 A1 * | 5/2004 | Mersch | ................. | E05F 15/695 318/62 |
| 2005/0203690 A1 * | 9/2005 | Russ | ........................ | E05F 15/40 701/49 |
| 2006/0185248 A1 * | 8/2006 | Kollner | ................. | E05F 11/488 49/352 |
| 2006/0288642 A1 * | 12/2006 | Marentette | .............. | E05F 15/41 49/26 |
| 2006/0293821 A1 * | 12/2006 | Takahashi | ............. | H02H 3/006 701/49 |
| 2008/0136358 A1 * | 6/2008 | Newman | ............ | B60H 1/00735 318/286 |
| 2009/0058340 A1 * | 3/2009 | Sakai | ....................... | G05B 9/02 318/434 |
| 2009/0237024 A1 * | 9/2009 | Batejat | ................ | H02H 7/0851 318/466 |
| 2010/0043295 A1 * | 2/2010 | Barr | ..................... | E05F 11/485 49/352 |
| 2010/0332086 A1 * | 12/2010 | Zhao | .................... | E05F 15/695 701/49 |
| 2011/0314737 A1 * | 12/2011 | Schindhelm | ............ | E05F 15/70 49/31 |
| 2012/0090240 A1 * | 4/2012 | Zellmer | ..................... | B60J 1/14 49/31 |
| 2012/0095650 A1 * | 4/2012 | Pruessel | ................ | E05F 15/695 701/49 |
| 2012/0136532 A1 * | 5/2012 | Konchan | ............... | B60J 10/046 701/36 |
| 2012/0234621 A1 * | 9/2012 | Syvret et al. | ........ | E05F 15/1684 180/281 |
| 2013/0055642 A1 * | 3/2013 | Patterson | ................ | G03G 15/06 49/349 |
| 2013/0118372 A1 * | 5/2013 | Laurent | ................ | B61B 12/007 104/196 |
| 2014/0173984 A1 * | 6/2014 | Schlesiger | ........... | H02H 7/0851 49/28 |

* cited by examiner

METHOD FOR SHORT DROP ADJUSTMENT IN A FRAMELESS GLASS VEHICLE WINDOW SYSTEM

BACKGROUND OF THE INVENTION

The present invention relates to a method for estimating and adjusting the short drop distance of a vehicle window glass in a frameless glass window system.

Frameless windows are common in convertible cars. Convertible cars have a canopy which can be moved from an extended position to a retracted position. In the retracted position of the canopy there is no part of the canopy which engages with the top edge of the window. However, in the extended position of the canopy the top edge of the window engages with at least a part of the canopy. In the extended position of the canopy, when the door is opened, the window glass has to be lowered to a position which is slightly below the fully closed position. When the door is shut, the window glass is raised to a fully closed position in which it seals into a seal extending along the canopy of the vehicle above the window. When a door handle is operated to open the door, the window glass is lowered out of the seal in the canopy to enable the door to be opened without interference between the seal and window glass during this process. This lowering of the window while opening the door is commonly referred to as "Short-Drop". However, the distance for which the glass lowering is required to be such that the "daylight" maximum opening shall not exceed a predetermined limit. For example 4 mm according to US regulation FMVSS118 or maximum opening shall not exceed 12 mm according to Directive 2000/4/EC of the European Parliament. This is required because safety regulations require that if the glass is open for more than the predetermined limit, then during a window close operation, obstacle detection and reversal (commonly called as Anti-Pinch) should be active. However, the Anti Pinch detection cannot be activated unless the motor has attained a certain stable speed. Hence if the glass is lowered just slightly more than the predetermined limit, the chances are that safety regulations would not be met. On the other hand, if the glass is not sufficiently lowered, the seal will get damaged when the door is opened and closed or there will be damage to the glass itself.

Also, these specifications have to be met over the temperature range of −40 to +80 degrees centigrade. Lowering the window by big distances would be an irritant to the user and hence is not a good option.

The windows are usually operated through an electric motor which is associated with a mechanism for controlling the movement of the window glass. The electric motor is controlled by an Electronic Control Unit (ECU). The ECU usually has a hall sensor to determine the number of rotations of the motor which in turn represents the distance moved by the window glass. The motor is coupled to the glass through mechanical linkages including a cable. The position estimation in power windows is based on the motor rotations measured by the hall sensor. However, it does not accurately represent the glass position because the window glass does not start moving as soon as the motor moves because of the slack in the cable and the other mechanical linkages. When the window glass is lowered or raised for a small distance, the window glass does not move to an exact position due to the cable slack and other mechanical linkages. Hence there will be a position lag of the window glass and there is a need to calculate accurate position of the window glass and correct this position lag.

SUMMARY OF THE INVENTION

The present invention is advantageous in that it detects a position lag of a window glass and adds this correction to the short drop distance. The invention according to the first embodiment, determines an actual movement of the window glass respective to a movement of the motor and it estimates a position lag of the window glass based on the actual movement of the window, movement of the motor and an ambient temperature; and adds correction to short drop distance based on the position lag of the window.

According to one of the embodiment the method estimates cable stiffness based on the ambient temperature. As the cable stiffness varies with temperature and lifetime, the position lag of the window glass is estimated accurately. Thus the present invention is advantageous in that it eliminates inaccuracies in the system.

BRIEF DESCRIPTION OF THE ACCOMPANYING DRAWINGS

Different embodiments of the invention are disclosed in detail in the description and illustrated in the accompanying drawing.

DETAILED DESCRIPTION

Figure 1:
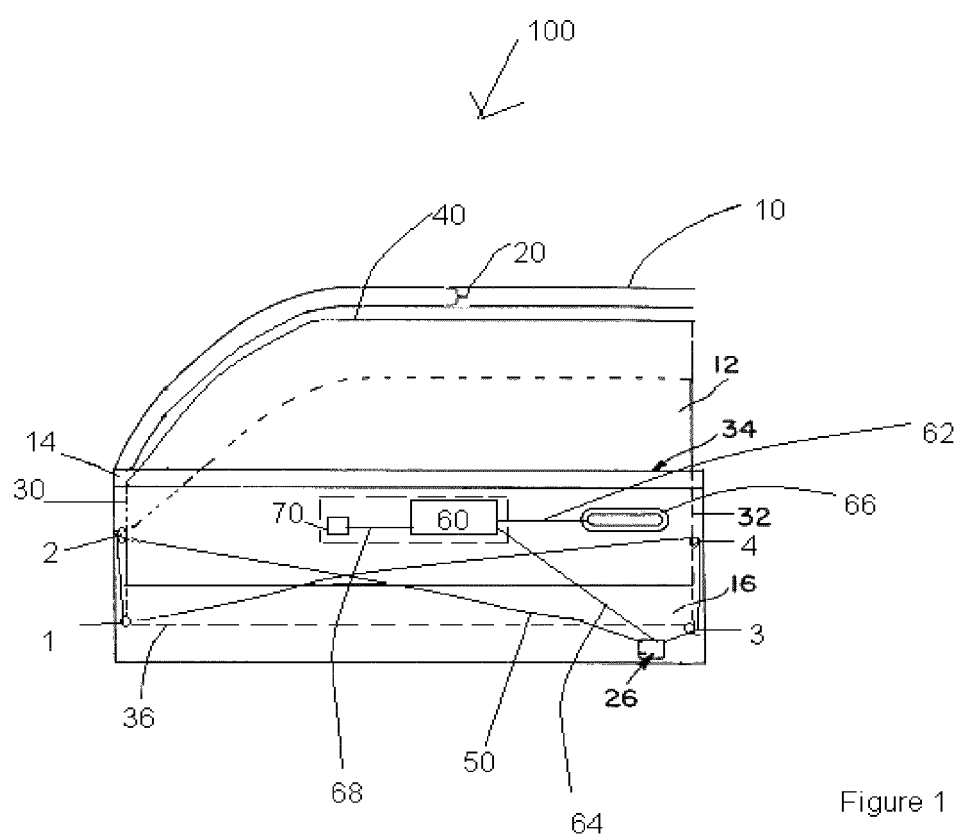
FIG. 1 illustrates a schematic diagram of a vehicle door system.

A vehicle door system 100 shown in FIG. 1 comprises a window glass 12 which can be lowered into a well 14 of a panel member 16 forming the door 100. For raising and lowering of the window glass 12 there is provided within the panel member 16 a mechanism 1,2,3,4 having a cable 50 fitted onto this mechanism which grips guide rails (not shown) on which the window glass 12 is mounted This mechanism is driven via the cable 50 from an electric motor 26 which is controlled by an electronic control unit (ECU) 60 via signal line 64. The window glass 12 is held at its front and rear edges 30, 32 within the panel member 16 by guide rails (not shown) which are movable with the movement of the motor associated with the cable 50. The electronic control unit (ECU) 60 has a temperature sensor 70 which provides the value of ambient temperature. The door panel has a door handle 66 which is connected to the electronic control unit 60 via a signal path 62.

A canopy 10 shown in FIG. 1 is electronically controlled and opening and closing operation is controlled by a separate electronic control unit. The canopy 10 has a sealing 20 extending along the length of the canopy of the vehicle in which the window glass 12 can be raised into its closed position when the door is shut.

Figure 2:
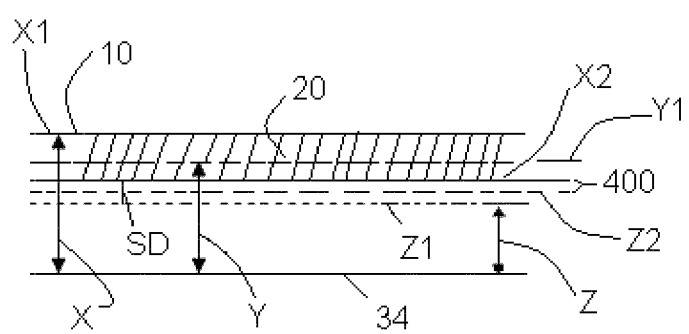
FIG. 2 illustrates the position of the window glass.

FIG. 2 shows the position of the window glass 12. The window glass 12 can be raised from an upper edge 34 of the panel 16 to a fully closed position X1 of the sealing 20. The distance X, Y and Z correspond to the window glass travel from the upper edge 34 of the panel 16 into the sealing 20. The window glass 12 can be raised into a fully closing position X1 or a minimum closing position X2 into the sealing 20 when the door is shut. The window can also be lowered from the sealing 20 below the minimum closing position X2 when the door is opened. The window is lowered out of the seal 20 to enable the door to be opened without interference between the seal 20 and the window glass 12. This is commonly referred as "Short-Drop" (SD). If the window glass 12 is not sufficiently lowered, the seal 20 will get damaged when the door is opened or there will be damage to the glass itself. When the door is open, it is expected that the window glass 12 is lowered to a position which is slightly below the minimum closing position X2. When the door is shut, it is expected that the window glass 12 is raised to a fully closed position X1 in which it seals into the sealing 20 to an air tight position or any where between the position X1 and the position X2, for example in the illustration the position Y1. When the door is shut or open, the movement of the window glass 12 corresponding to movement of the motor 26 is not exactly same due to some parameters. The parameters are a cable temperature, cable stiffness, a motor speed and a motor voltage or a motor current that is applied to the motor. Due to the aging and also due to the temperature variance, the cable 50 loosens its stiffness and cable tension needs to be adjusted regularly. Hence when the door is shut the window glass 12 would move to a position Z2 which is still below the minimum closing position X2 or when the door is opened, the window glass 12 is lowered to a position X2 instead of position Z2. The distance between the position X2 and the position Z2 is a position lag 400 which needs to be corrected. The position lag 400 can be of several motor rotations and when translated into glass movement it would correspond to a distance measured in millimeters (mm) of window glass 12 travel. For example if 1 motor rotation corresponds to 1.6 mm of window glass 12 travel, then 7.5 motor rotations would correspond to 12 mm of window glass 12 movement. If this position lag 400 is not estimated and corrected, the window glass 12 would stop movement much earlier. However, the position lag 400 cannot be set at a fixed value and a fixed correction factor cannot be applied due to cable stiffness which varies with temperature. A procedure for correcting this position lag 400 is described in FIGS. 3 and 4.

Figure 3:
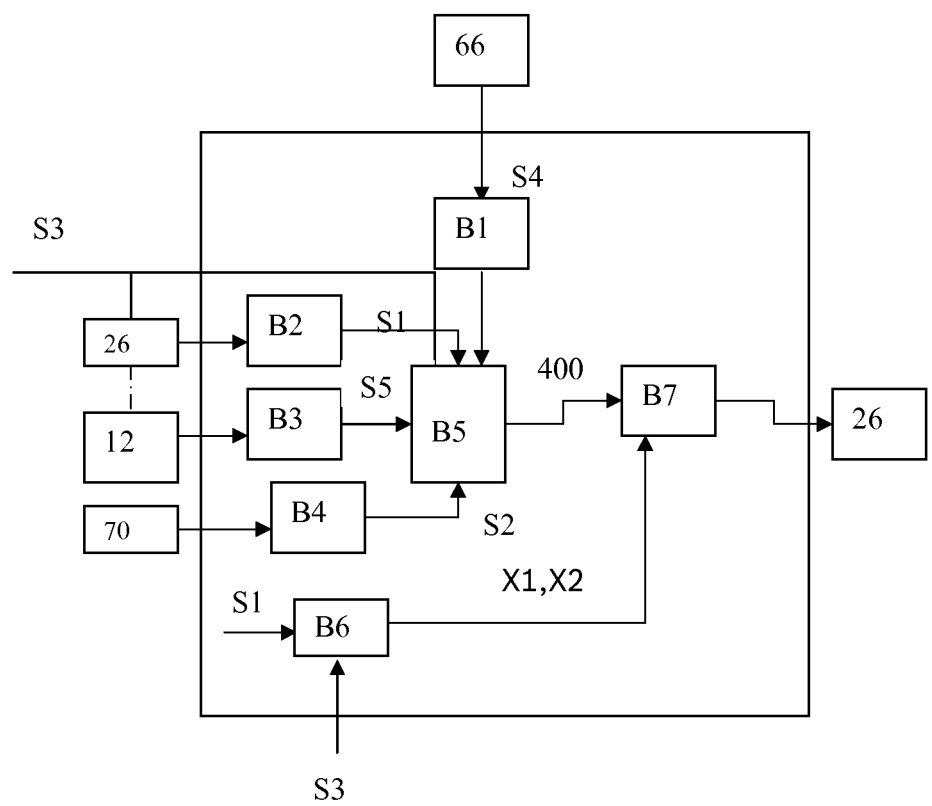
FIG. 3 illustrates a block diagram of the present invention to correct the position lag 400 of the window glass 12 movement.

FIG. 3 illustrates a block diagram 500 of the present invention to correct the position lag 400 of the window glass 12 movement. As shown in the FIG. 3, a door operating means B1, a motor movement determining means B2, a window glass movement determining means B3, a cable stiffness determining means B4, a position lag estimating means B5, window seal position detection means B6 and a correcting means B7 are part of a method executed by the ECU 60. The ECU 60 determines the closing or opening operation of the door 100. The opening or closing of the door 100 is determined by a door operating means B1 when the door handle 66 has been operated. When a door operating signal S4 via the signal path 62 becomes active, the ECU 60 provides a control signal to start the motor 26 to lower or raise the window glass 12 via the signal line 64. The motor 26 movement determining means B2 determines the motor speed S1 based on the voltage S3 that is applied to the motor 26. The window glass movement determining means B3 determines the actual window position in relation to the movement of the motor 26. The position lag estimating means B5 uses the door operating signal S4 to start the window position lag estimation based on a motor speed S1, a cable stiffness S2, a motor voltage S3, actual position of the window glass X2, a motor position and a predetermined position of the window glass Z2. The cable stiffness S2 is determined by determining an ambient temperature and the slack due to mechanical linkages from the drive mechanism 1, 2, 3, 4. The motor position depends on the number of rotations of the motor 26 and is determined from a hall sensor (not shown). The window seal position detection means B6 is fed with the signals motor speed S1 and voltage S3, which determines the window seal position based on the force that is applied to the window glass 12 and the system damping when the glass enters the seal. The objective of the detection is to determine when the glass is very close to the position where it stops moving. The motor movement beyond this point is only due to the slack in the cable and other non linearities due to mechanical components which vary with temperature and ageing. Based on the motor speed S1, cable stiffness S2 and motor voltage S3 the position lag estimating means B5 determines the number of rotations of the motor 26 after which the window glass 12 starts moving after the motor 26 has been activated. It provides the window glass position lag 400 to the correcting means B7 which uses it for correcting the position lag 400 for which the motor 26 needs to be ON. The position lag 400 relative to the window seal position X2 is provided by the window seal position detection means B6. The correcting means B7 continuously calculates the remaining position to reach the predetermined position Z2 at which the motor 26 has to be switched OFF. The motor position has been adjusted based on position of the window glass 12, the required short drop distance SD, the position lag 400, the window seal position X1 and the motor speed dependant on motor voltage S3. The correcting means B7 continuously checks for the position lag 400 that have been corrected to reach the predetermined position Z2. If not, the motor 26 movement is adjusted until it reaches the predetermined position Z2. Once the predetermined position has been reached, the motor 26 movement is stopped.

Figure 4:
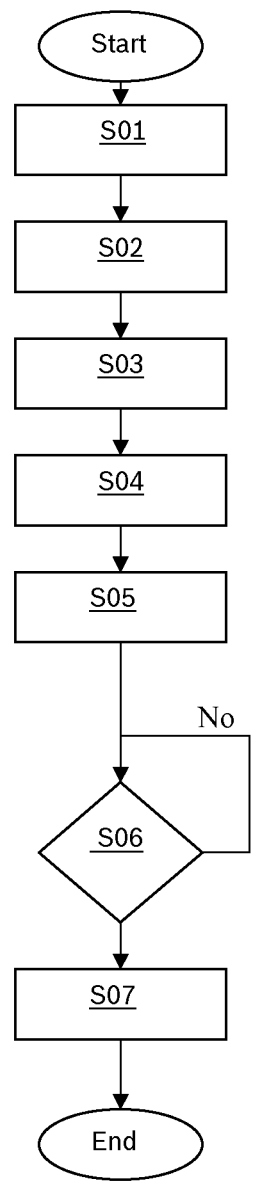
FIG. 4 illustrates a method for determining and correcting a position lag of the window glass.

FIG. 4 illustrates a method of the present invention to correct the position lag 400 of the window glass 12 movement. The method is executed in the ECU 60. In this particular description the position lag correction is described for the door opening operation, but the description also holds good for the door closing operation. In Step S01, the ECU 60 determines the closing or opening operation of the door 100. The opening or closing of the door is determined by the door operating means B1 when the door handle 66 has been operated. In the next step S02, a window seal position is determined. When the door is opened, the window glass 12 is lowered to a position say X2 due to the parameters cable stiffness S2, motor speed S1 and motor voltage S3 that is applied to the motor 26. It is expected that the window glass 12 has to be lowered to the position Z2 in order to avoid other safety features to be activated. In the step S02, the ECU determines an actual position X2 of the window glass 12 with respect to the movement of the motor 26. The ECU 60 determines movement of the window glass 12 by the window glass movement determining means B3. The ECU 66 determines the movement of the motor 26 by the motor movement determining means B2. In the step S03, the ECU 60 measures an ambient temperature from the temperature sensor 70 and calculates the cable stiffness S2 by the cable stiffness determining means B4. The cable stiffness S2 is depends on the ambient temperature and is determined from the measured ambient temperature. In the step S04, a position lag estimating means b5 estimates the position lag 400 of the window glass based on the actual position X2 of the window glass 12 in relation to the movement of the motor 26, the cable stiffness S2 and the predetermined position Z2 of the window glass 12. In the step S05, Based on the ambient temperature and the position lag 400, the motor movement is initiated to correct the position lag 400 by a correcting means B7. In the step S06, the correcting means B7 continuously checks for the predetermined position Z2 that have been reached. If not, motor movement is adjusted until it reaches the predetermined position Z2. Once the predetermined position Z2 has been reached, at step SO7 motor movement is stopped.

Although the present invention has been described in relation to particular embodiments thereof, many other variations and modifications and other uses will become apparent to those skilled in the art.

We claim:

1. A method for controlling movement of a window glass in a vehicle using an electric motor associated with a drive mechanism through a cable, said method comprising the steps:
    determining a first position of the window glass based on movement of the motor;
    determining a stiffness of the cable, wherein said stiffness is determined based on an ambient temperature;
    determining a position lag of the window glass based on the determined first position of the window glass, a second position of the window glass representing a desired position of the window glass, and the stiffness of the cable, wherein the position lag represents a distance between the window glass and the second position of the window glass; and
    operating the electric motor to correct for the position lag of the window glass based on the determined position lag.

2. The method according to claim 1, wherein said ambient temperature is determined by a temperature sensor.

3. The method according to claim 1, wherein said movement of the motor is determined based on a motor speed, a motor voltage, and a number of rotations of the motor.

4. The method according to claim 3, wherein said number of rotations is determined by a hall sensor.

5. The method according to claim 4, wherein the position lag of the window glass is further corrected by determining a window seal position.

6. An electronic control unit (ECU) for controlling movement of a window glass in a vehicle door system having a door, said system comprising an electric motor associated with a drive mechanism through a cable, said ECU is configured to:
    detect opening or closing of the door;
    determine movement of the motor upon opening or closing of the door;
    determine a first position of the window glass in relation to the said motor movement;
    determine a stiffness of the cable, wherein said stiffness is determined based on an ambient temperature;
    determine a position lag of the window glass based on the determined first position, a second position of the window glass representing a desired position of the window glass, and the stiffness of the cable, wherein the position lag represents a distance between the window glass and the second position of the window glass; and
    operate the electric motor to correct for the position lag of the window glass based on the determined position lag.

* * * * *